Jan. 9, 1923.
G. E. ROBINSON.
CYLINDER GRINDING MACHINE.
FILED MAR. 24, 1920.
1,441,242
2 SHEETS-SHEET 1
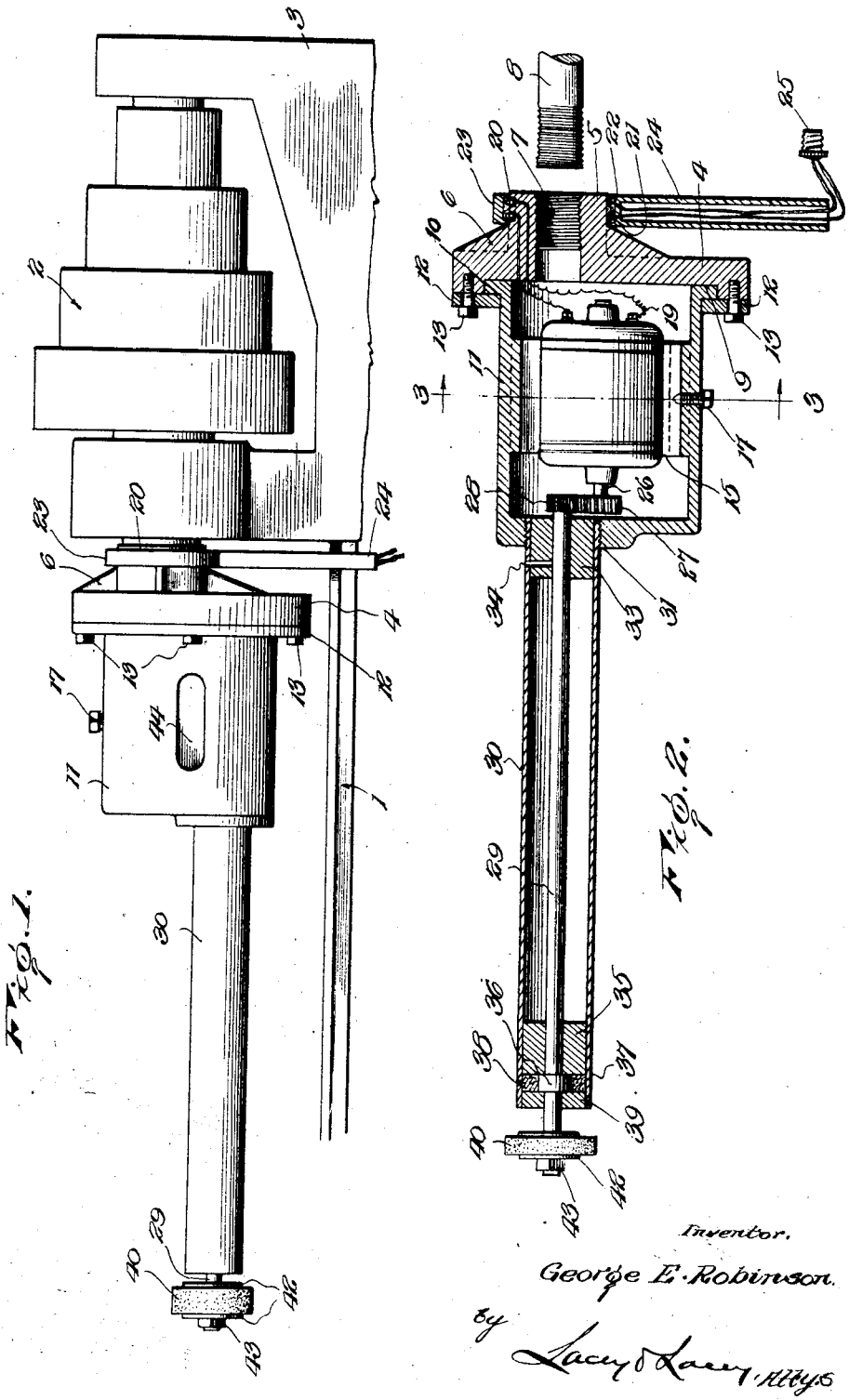
Inventor.
George E. Robinson.
by
Lacy & Lacy, Attys.

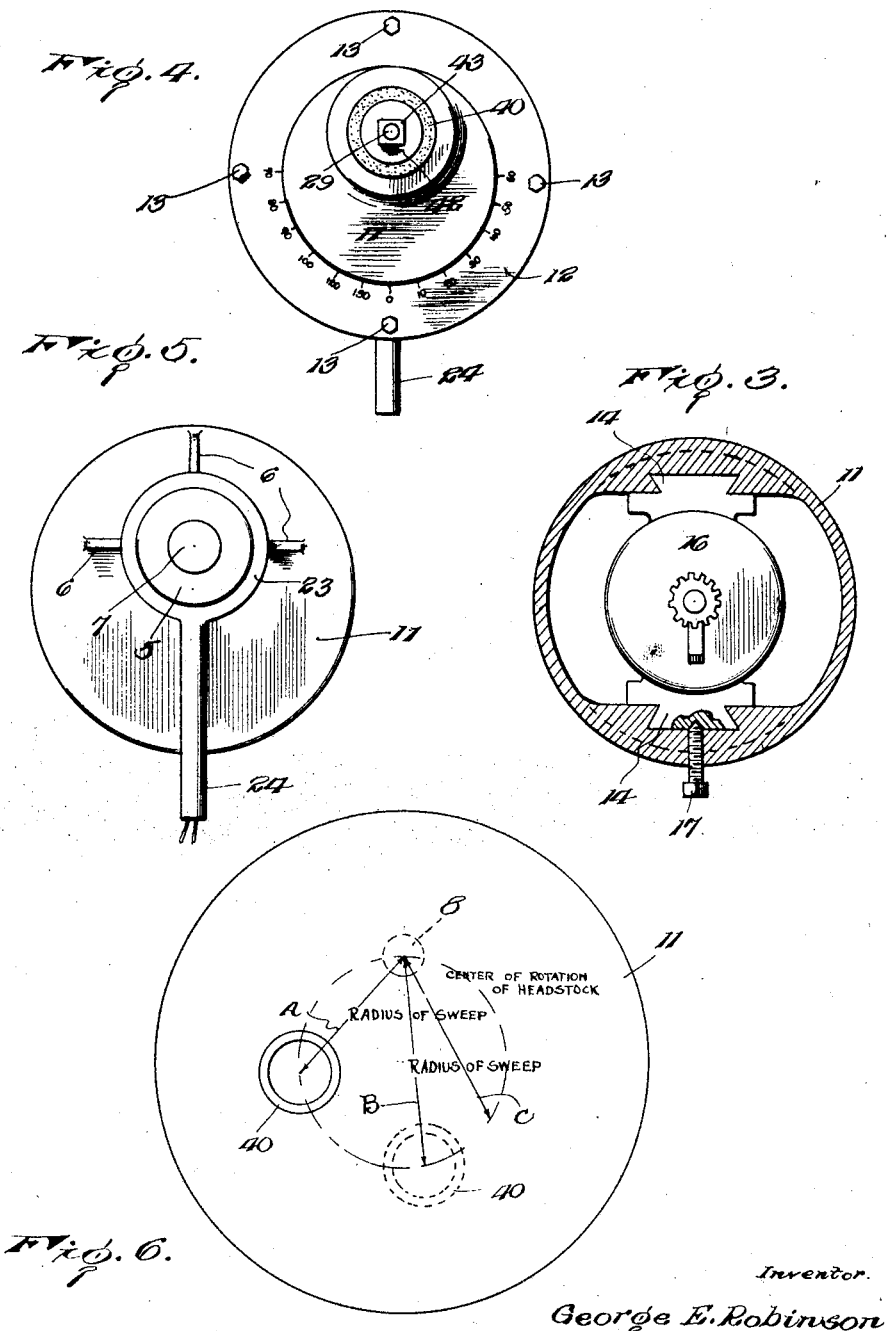

Patented Jan. 9, 1923.

1,441,242

UNITED STATES PATENT OFFICE.

GEORGE E. ROBINSON, OF PORTLAND, OREGON.

CYLINDER-GRINDING MACHINE.

Application filed March 24, 1920. Serial No. 368,332.

*To all whom it may concern:*

Be it known that I, GEORGE E. ROBINSON, a citizen of the United States, residing at Portland, in the county of Multnomah and State of Oregon, have invented certain new and useful Improvements in Cylinder-Grinding Machines, of which the following is a specification.

This invention relates to a cylinder grinding machine in the form of an attachment for lathes and is an improvement over that type covered in Patent No. 1,306,720, issued to me June 17, 1919.

The present invention provides a cylinder grinding machine in the form of a tool for mounting on the head stock of a lathe, such tool being independently driven with respect to the lathe and eccentrically adjustable as regards the axis of rotation of the lathe head stock, whereby cylinders of different diameters may be ground by simply changing the sweep of the tool.

Also, an important feature of this invention, in addition to the self contained drive of the tool, is the mounting of said drive in relation to the tool in such manner that the ratio of the drive may be easily varied by an interchange of the driving medium so as to obtain different speeds for grinding different surfaces and for using different grinding tools.

In addition to the foregoing the tool or machine is rendered still more practicable by reason of the fact that its construction incorporates means whereby the drive shaft for the tool may be easily lubricated, and also, dust is prevented from entering the bearings of the shaft.

Furthermore, the individual or self contained drive for the tool, which drive is entirely independent of the lathe drive, comprises an electric motor which is bodily movable with the tool carrying arm and therefore a further object of the invention resides in the provision of efficient means for supplying current to the motor drive.

In the drawings:

Figure 1 is a side elevation of the attachment as applied to the head stock of the lathe;

Fig. 2 is a longitudinal central section of the attachment;

Fig. 3 is a section on the line 3—3 of Fig. 2;

Fig. 4 is an end elevation viewed from the tool end;

Fig. 5 is an end elevation viewed from the head stock attaching end;

Fig. 6 is a diagrammatic view showing the range of adjustment of eccentricity of the tool with respect to the center line of the head stock of the lathe.

In detail:

The lathe bed is indicated at 1 and carries the usual head stock 2 supported in the head stock frame 3, said head stock 2 having the customary arrangement of stepped driving pulley faces, all of which are parts typical of ordinary lathe construction.

The grinding machine or tool attachment comprises a base plate 4 having the boss 5 eccentric to the said base plate 4 and strengthened by reinforcing ribs 6. The boss 5 is bored and threaded as at 7 to be screwed onto the head stock spindle 8.

The base plate 4 is counterbored at 9 eccentric to the axis of the boss 7 to provide a seat for the shoulder flange 10 of a motor housing 11, said housing 11 being adjustably held in position on the base plate 4 by a calibrated ring 12 retained in place by bolts or cap screws 13. Within the motor housing 11 are grooves 14 receiving tongues 15 carried by a motor 16; a set screw 17 holds the motor 16 against longitudinal displacement within the housing 11, but permits of easy removal of the motor from said housing. The motor 16 obtains current through wires 18 and 19 connected with said motor and terminating in machined annuli 20 on the boss 5 where two flush contacts are provided. The current is led to said contacts by slip rings 21 and 22 insulated from each other and carried by an insulating ring 23 having a hollow arm 24 through which the wires are led to the said slip rings 21 and 22; said wires may carry a plug 25 for connection with an electric lamp socket or other source of energy. Winding of the wires about the attachment in adjusting the same is avoided by the described arrangement.

The armature shaft 26 of the motor 16 carries a gear 27 which meshes with the pinion 28 on the tool drive shaft 29 which is enclosed within a hollow arm or projector 30. Said hollow arm 30 is threaded as at 31 to enter a threaded aperture in the end of the motor casing eccentric to the center line of the base plate 4. At the motor end of the tool carrying arm 30 is a bushing 33 in which the tool drive shaft 29 runs, and said bushing receives oil through the oil hole 34. At the forward end of the tool drive shaft 29 is a similar bushing 35, one face of which forms an end thrust bearing for the thrust collar 36 surrounded by a felt washer 37 saturated with oil through the oil hole 38 in the arm 30. The end of said hollow arm 30 is closed by a washer 39 forming a retainer for said felt washer 37 to prevent the entrance of dust formed during grinding.

The end of the shaft 29 receives the cutting or grinding tool 40 which is held in place thereon by the face plates 42 and the nut 43.

The adjustment of the tool is diagrammatically illustrated in Fig. 6. Due to the eccentricity of the projector 30 with respect to the center line of the base plate 4, and the eccentricity of the boss 5 of the base plate 4 with respect to the said base plate which offsets the said base plate with regard to the center line of the head stock of the lathe, rotative adjustment of the motor housing 11 on said base plate 4 will vary the sweep of the projector for accurately boring or reboring cylinders of different sizes. The graduations of the calibrated ring 12 are such that different adjustments may be easily made and some of such adjustments are indicated in Fig. 6 by the radii A, B and C.

In order to cool the motor 16, apertures 44 may be provided in the motor housing if desired.

I claim:

1. The combination of a base plate counterbored on one side and having a boss on the opposite side eccentrically positioned on the plate, the boss being constructed to be secured to a head stock spindle, a closed motor housing provided at one end with an annular flange rotatably seating in the counterbore in the base plate, a retaining ring secured upon the base plate and overhanging the flange on the motor housing, a motor rigidly secured in permanent position within said housing, a hollow arm projecting eccentrically from the motor housing at the end of the same remote from the flange, a shaft extending through said arm, and operative connections within the motor housing between said shaft and the motor.

2. A cylinder grinding device comprising a cylindrical housing having an open end provided with an annular flange, a motor, means for securing the motor in permanent position within said housing and co-axially therewith, a rigid arm on the other end of the housing with its axis eccentric to the motor axis, a tool-carrying shaft revolubly mounted within said arm having operative connection with said motor; a base plate provided with a counter-bore adapted to receive said annular flange and clamping means for said flange for circumferentially adjusting the housing therein, a boss on said base plate having its axis eccentrically positioned with relation to the motor axis and constructed to be secured to a driving shaft.

In testimony whereof I affix my signature.

GEORGE E. ROBINSON. [L. S.]